Jan. 23, 1973  KOZO UCHIDA  3,713,029
TRIGGERING METHOD
Filed Nov. 5, 1968  2 Sheets-Sheet 1

Jan. 23, 1973　　　KOZO UCHIDA　　　3,713,029
TRIGGERING METHOD

Filed Nov. 5, 1968　　　　　　　　　　　　2 Sheets-Sheet 2

United States Patent Office 3,713,029
Patented Jan. 23, 1973

3,713,029
TRIGGERING METHOD
Kozo Uchida, Tokyo, Japan, assignor to Iwatsu
Electric Co., Ltd., Tokyo, Japan
Filed Nov. 5, 1968, Ser. No. 773,611
Claims priority, application Japan, Nov. 9, 1967,
42/71,647, 42/71,648
Int. Cl. H03k 17/00
U.S. Cl. 328—63                                   4 Claims

ABSTRACT OF THE DISCLOSURE

An improved triggering method used in a sampling device or a device requiring trigger input signals for realizing a faithful synchronization of an output signal with an input signal given to the aforementioned device. A variable of a sampler circuit such as voltage or current is automatically adjusted to a value which can bring the synchronization in a transfer of the input signal through the sampler.

---

Figure 1A:
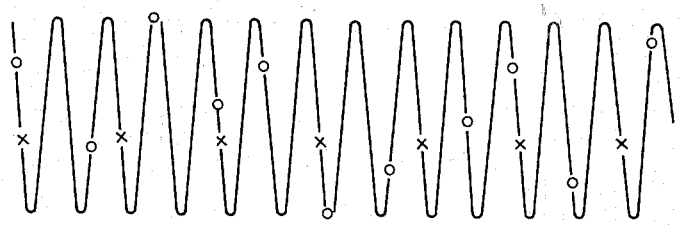

The present invention relates to an improved triggering method, more particularly relates to an improved triggering method for acquiring automatically and in a stable condition an output pulse faithfully synchronized with an input signal or a trigger input signal on a sampling device such as a sampling oscilloscope and a device such as an oscilloscope or a pulse generator which requires trigger input signals.

As is well-known, a trigger circuit used in the devices of the aforementioned types is provided with a function to convert trigger input signals having a frequency higher than a certain constant value into output pulses synchronized with the trigger input signals and having a frequency lower than the certain constant value. However, when the frequency of the trigger input signals is lower than the certain constant value, there takes place no conversion of the frequency. Usually, in actual utilization of the trigger circuit, various types of input signals having difference in frequency, amplitude and wavelength are brought into the trigger circuit. In order to acquire output pulses faithfully synchronized with such input signals of miscellaneous types always in a stable condition, it is necessary to manually adjust the synchronizing level of the input signals or to put the trigger circuit in a free running condition and, thereafter, manually adjust the free running frequency thereof. The aforementioned manual adjustment is usually carried out, for instance, by manually adjusting the value of voltage applied to the circuit or the value of current through the circuit while observing wave-forms shown on a display of, for instance, an oscilloscope. As is well experienced by persons skilled in the art, such manual operation has been too complicated to be adapted in actual use of the circuit. The higher the frequency possessed by the trigger input signals, the more complicated will be the aforementioned manual adjustment.

A principal object of the present invention is to provide an improved triggering method which can present, automatically, output pulses having a frequency faithfully synchronized with that of input signals.

Another object of the present invention is to provide an improved triggering method eliminating troublesome manual adjustments of the trigger circuit which was usually the case with the conventional triggering method.

A further object of the present invention is to provide an improved triggering method which is effectively adapted in cases where input signals of miscellaneous types are to be converted into output pulses well synchronized with the input signals.

In order to conform with the aforementioned objects of the present invention, the method of the present invention consists of automatically effecting the approach of a variable, such as, voltage or current of a sampler (explained infra) to a value which can bring a faithful synchronization in the transfer of an input signal through the sampler.

Further features and advantages of the present invention will be apparent from the ensuing description, reference being made to the accompanying drawings to which, however, the scope of invention is in no way limited.

Figure 1B:
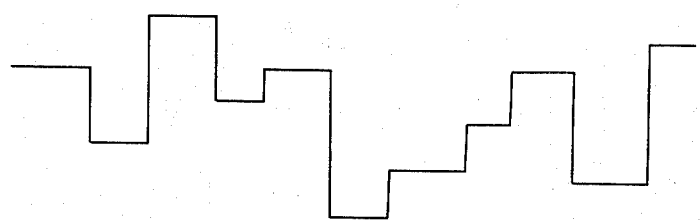
Figure 2A:
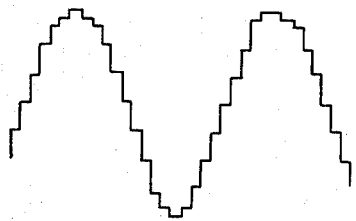
Figure 2B:
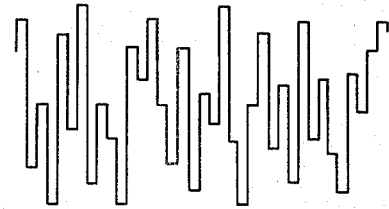
Figure 3:
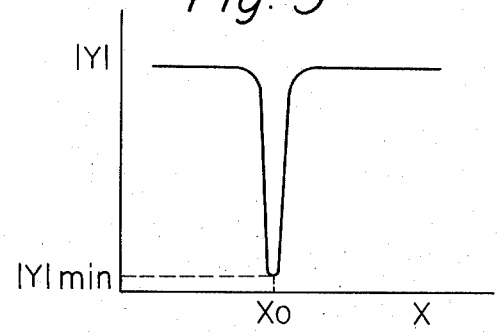
Figure 4:
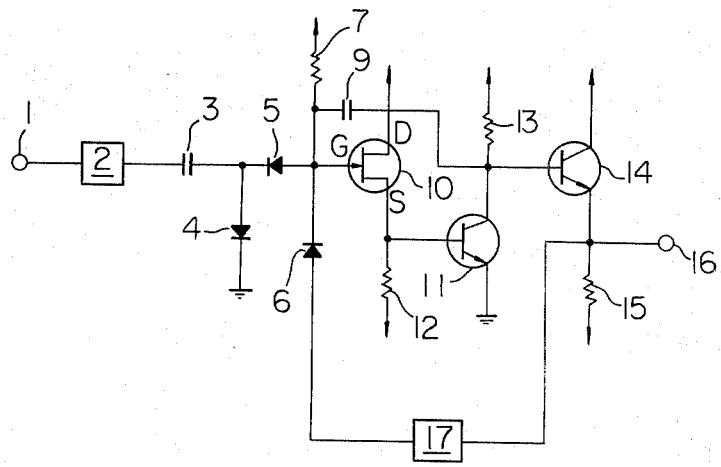
Figure 5A:
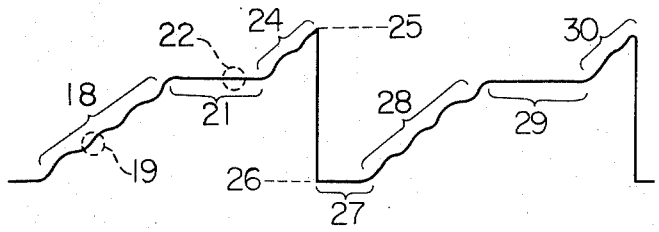
Figure 5B:
Figure 5C:
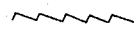
Figure 6:
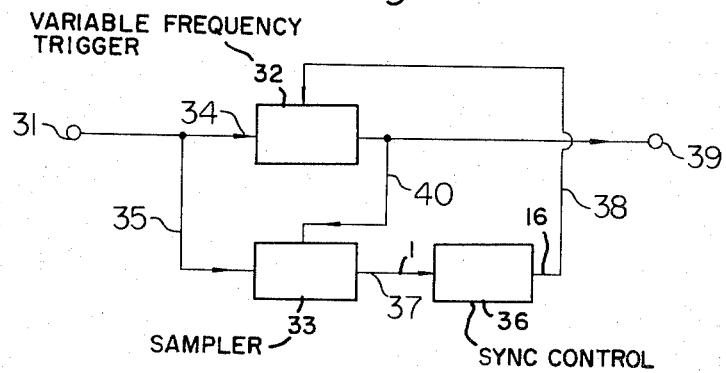

FIGS. 1A and 1B are diagrams for showing a wave-form of a trigger input signal used in the present invention, FIGS. 2A and 2B are diagrams for showing a sampled wave-form of a sine-wave obtained at a sampling device according to the present invention, FIG. 3 is an explanatory diagram of the principle adopted in the present invention, FIG. 4 is a circuit diagram of an embodiment of a circuit used in the present invention, FIG. 5A is a diagram for showing a wave-form obtained in the circuit shown in FIG. 4, FIGS. 5B and 5C are enlarged diagrams for showing portions of the wave-form shown in FIG. 5A in an enlarged condition, FIG. 6 is a block diagram of an embodiment of the present invention.

Referring to FIG. 1A, a trigger input signal having a wave-form of a sine-wave and to be brought into a trigger circuit is shown. By extracting parts of the signal, sampling the extracted parts using non-synchronized pulses so as to pick up only amplitude components and holding the picked-up amplitude components till the subsequent sampling, staircases as shown in FIG. 1B is acquired. In FIG. 1A, the points marked with O correspond to points sampled with the non-synchronized pulses while the points marked with X correspond to points sampled with the synchronized pulses. The parts of the wave sampled with the latter and maintained, as aforementioned, are always kept constant. In the following description, the circuit having the aforementioned sampling and holding function is hereinafter referred to as "a sampler."

In case the sine-wave is subjected to sampling on a sampling device, such as a sampling oscilloscope, with the aforementioned synchronization a staircase waveform approaching a sine-wave as shown in FIG. 2A is acquired while a staircase waveform as shown in FIG. 2B is acquired in case sampling is performed with non-synchronization.

A principle adopted in the method of the present invention is diagrammatically illustrated in FIG. 3, wherein the value of $a$=variable component, such as voltage or current, is taken on the abscissa while the absolute value of Y, which is presented as a value of the output waveform $V(t)$ from the sampler differentiated by the time $t$, is taken on the ordinate. The minimum value of $|Y|$ is acquired when complete synchronization of the output pulses with the input signals is realized. It is understood that the curve in the drawing will have more than one minimum value when the aforementioned value X of the variable component is changed over the whole range thereof. Although, in the drawing, a case having only one minimum value is introduced, a discussion applied to the present case in the following description can well and similarly be applied to another case, wherein, more than one minimum value is possessed by the curve. In the drawing, the value $X_0$ corresponds to the minimum value of $|Y|$. In other words, if the value X has a tendency to approach the value $X_0$, it will be possible to make the output pulses always well synchronized with the input signals. Therefore, by fixing the value X to $X_0$ or a value adjacent to $X_0$, it is possible to maintain the transfer of the signals always with faithful synchronization. In this connection, the method of the present invention consists of automatically effecting the approach of the value X to $X_0$ or to a value adjacent to $X_0$.

An example of an actual electric circuit used in carrying out the method of the present invention is shown diagrammatically in FIG. 4, wherein, the sampled wave, in other words, the output signal from the sampler, $V(t)$ is brought into the circuit through the input terminal 1. The circuit includes a differentiation circuit 2 connected to the input terminal 1, a capacitance 3 connected to the output of the differentiation circuit 2, two diodes 4 and 5 connected to the output of the capacitance 3 respectively, a diode 6 connected to the diode 5, resistors 7, 12, 13 and 15, a capacitance 9 connected to the diode 5, an FET 10 with the gate G thereof, connected to the diode 5, a transistor 11 with the base thereof, connected to the source S of the FET 10, a transistor 11 with the collector thereof connected to the gate G of the FET 10 via capacitance 9, an output terminal 16 of the circuit and a reset circuit 17 for performing a reset operation when the output voltage has reached the maximum value.

The operational features of the circuit shown in FIG. 4 will be explained below, reference being made to FIGS. 5A, 5B, and 5C wherein the wave-form of the signal obtained at the output terminal 16 as the output signal of the circuit is shown.

In FIG. 4, the signal $V(t)$ impressed on the input terminal 1 is differentiated while passing through the differentiation circuit 2 and the output signal Y from the differentiation circuit 2 is impressed to the capacitance 3. The connection including the elements 3 to 17 forms a kind of staircase generator circuit. Only a negative pulse from the capacitance 3 is impressed to the gate G of the FET 10 forming a source follower via diodes 4 and 5. Next, the negative pulse is impressed from the source S of the FET 10 to the base of the transistor 11 forming an amplifier and the collector voltage of the transistor 11 is raised. This change in the collector voltage of the transistor 11 is brought back again to the gate G of the FET 10 by way of the capacitance 9. As the negative pulses are successively impressed on the capacitance 3, the collector voltage of the transistor 11 is raised accordingly and the raised voltage thereof results in the output signal of the transistor 14 forming an emitter follower, of the output signal of the output terminal 16. The corresponding wave-form portion of the output signal thus acquired is shown by the wave-portion 18 in FIG. 5A and the details of a portion 19 of the wave-portion 18 is shown in FIG. 5B in an enlarged condition. The output signal from the output terminal 16 of the circuit shown in FIG. 4 is applied to the variables of the trigger circuit in order to change the value X shown in FIG. 3. When the value X approaches $X_0$ or a value adjacent to $X_0$, the value $|Y|$ becomes minimum or substantially minimum and the amplitude of the pulse impressed on the capacitance 3 becomes considerably reduced. As adequate voltage is applied to the gate G of the FET 10 through the resistor 7, an increase in the output voltage due to the extremely small pulse is balanced by a decrease in the output voltage due to the aforementioned adequate voltage through the resistor 7 and the output voltage is kept in constant condition as is shown by a wave-portion 21 in FIG. 5, a portion 22 of which is shown in enlarged form in FIG. 5C. Thus the synchronized condition of the output signal with the input signal is acquired.

Next, when the aforementioned synchronized condition is missed for some reason, the value $|Y|$ increases suddenly and the output voltage is also raised as is shown by a wave-portion 24 in FIG. 5A. When the output voltage has reached a given level 25, the reset circuit 17 operates and the increased output voltage is applied to the diode 6. During the period when the diode 6 is kept in a conducting condition, the output voltage is maintained in a lowered, constant condition shown by a wave-portion 27 in FIG. 5A. In the non-conducting condition of the diode 6, the output voltage again begins to increase as is shown by a wave-portion 28. As soon as the aforementioned synchronized condition is revived, the output voltage is again kept in a condition shown by a wave-portion 29 in FIG. 5A. Thus the deviation of the output signal from the synchronized condition with the input signal can be automatically and rapidly compensated and the output signals can effectively be kept in a substantially synchronized condition with the input signals whatever changes may happen during the actual utilization of the circuit.

As is mentioned supra, the value $|Y|$ is approached to the minimum value X according to the method of the present invention. In this connection, when the resistance of the resistor 7 or the value of the adequate voltage applied to the resistor 7 is changed, the inclination of the voltage causing a decrease of the output voltage (see FIG. 5C) is changed and the value $|Y|$ causing an increase of the output voltage is also changed accordingly. Therefore, it will be concluded that adjustment in the resistance of the resistor 7 or in the voltage applied to the resistor 7 will result in further approach of the value $|Y|$ to the minimum value $|Y|$ min.

Further application of the method of the present invention to devices other than a sampling device is given by a system shown in FIG. 6, wherein the system comprises an input terminal 31, a variable frequency trigger circuit 32 whose input terminal is connected to the input terminal 31, a sampler 33 whose input terminals are connected to the input terminal 1 and to the output terminal of the trigger circuit 32, a synchronization control circuit 36 whose input terminal is connected to the output terminal of the sampler 33 and whose output terminal is connected to an input terminal of the trigger circuit, an output terminal 39 and connections 34, 35, 37, 38 and 40 for connecting the aforementioned elements.

In the aforementioned arrangement of the system, the sampler 33 samples the given trigger input signal and provides a maintained wave-form $V(t)$ and the synchronization control circuit 36 controls the variables of the trigger circuit 32. Although the connection 35 is connected to the input terminal 31 in the present embodiment, it can also be connected to another signal source as long as the signal from the signal source is synchronized with the trigger input pulse.

In case the aforementioned system is applied to a sampling device, the trigger output pulse from the trigger circuit 32 is brought into the sampler 33 by way of a time base circuit.

As is repeatedly discussed, by the application of the method of the present invention, faithful and rapid synchronization of the output signals with the input signals can be assured by automatically and intermittently adjusting adequate variables of the trigger circuit by the synchronization control circuit.

While the invention has been described in conjunction with certain embodiments thereof, various changes and modifications may be made without departing from the scope and spirit of the present invention.

What is claimed is:

1. A method of synchronizing an input signal applied to a triggering circuit with the output signal delivered from said triggering circuit comprising: providing an adjustable triggering circuit operable to receive an input signal and deliver therefrom an output signal; applying an input signal representative of a triggering input signal to said triggering circuit; sampling and holding a portion of said input signal applied to said triggering circuit to derive a sampled signal; differentiating said sampled signal to obtain a differentiated signal; varying a variable component of said differentiated signal until the amplitude of said differentiated signal approaches a minimum value thereby obtaining a controlled differentiated signal; and applying said controlled differentiated signal to said triggering circuit to effect synchronization of the trigger circuit output signal with said input signal.

2. A method according to claim 1; wherein said varying step comprises generating a staircase waveform, and applying said differentiated signal to said staircase waveform to obtain said controlled differentiated signal.

3. An improved triggering method for controlling a trigger circuit comprising: providing a sample and hold circuit for sampling and holding a trigger input signal or a signal synchronized with said trigger input signal; differentiating an output of said sample and hold circuit; providing a synchronization control circuit for controlling a value of a variable element included with said trigger circuit; ceasing control of said value of said variable element when the amplitude of said differentiation circuit reaches a minimum value or a value adjacent to said minimum value; and maintaining said value of said variable in controlled condition; thereby automatically obtaining a synchronized condition.

4. An improved triggering method according to claim 3, said synchronization control circuit being a staircase generating circuit applying an output of said differentiation circuit thereto and controlling said value of said variable of said synchronizing circuit by applying an output signal of said staircase generating circuit to said trigger circuit.

References Cited

UNITED STATES PATENTS

| | | | |
|---|---|---|---|
| 2,630,482 | 3/1953 | Bostwick | 328—139 X |
| 2,864,950 | 12/1958 | Pornick | 328—139 |
| 2,956,118 | 10/1960 | Goodrich | 328—139 X |
| 3,079,563 | 2/1963 | Marsh et al. | 328—141 X |
| 3,081,434 | 3/1963 | Sandberg | 328—139 X |

STANLEY D. MILLER, JR., Primary Examiner

U.S. Cl. X.R.

178—69.5; 307—269; 328—127, 151, 155